March 23, 1954 P. E. REEVES 2,673,237

SUBSCRIBER TRANSMISSION SYSTEM

Filed June 5, 1948

2 Sheets-Sheet 1

PIERCE E. REEVES
INVENTOR.

BY Bruce L. Birchard
HIS AGENT

PIERCE E. REEVES
INVENTOR.

BY Bruce L. Birchard

HIS AGENT

Patented Mar. 23, 1954

2,673,237

UNITED STATES PATENT OFFICE 2,673,237

SUBSCRIBER TRANSMISSION SYSTEM

Pierce E. Reeves, Park Ridge, Ill., assignor to Zenith Radio Corporation, a corporation of Illinois Application June 5, 1948, Serial No. 31,345

15 Claims. (Cl. 178—5.1)

This invention relates to image transmission systems and more particularly to such systems of the subscriber type in which television signals are transmitted in coded form together with key signals, which television signals may be reproduced only in subscriber receiving systems upon the receipt of the key signals.

In Patent 2,547,598, E. M. Roschke, issued April 3, 1951, entitled Image Transmission System, and assigned to the present assignee, a system is disclosed wherein during spaced time intervals the video portion of a transmitted television signal is delayed a predetermined amount with respect to the synchronizing signal and blanking pedestal positions thereof. The system disclosed in the above mentioned patent provides for the transmission of a key signal to subscriber receiving systems to indicate the time intervals during which the video portion of the television signal is so delayed so that corrective circuits may be initiated in such receiving systems to cause proper reproduction of the television signal. It was found in the above described system that when the television signal was corrected in a subscriber receiving system an objectionable flicker occurred in the reproduced image. This condition was due to the fact that the transmitted television signal contained a video portion, the timing of which was changed between a normal and a delayed value during spaced intervals, and the television signal further contained blanking pedestals which remained fixed in time. The signal content of each line of the video portion of the transmitted signal changed therefore, each time this portion varied between a normal and delayed condition, which gave rise to the above mentioned flicker in the reproduced image.

It is, accordingly, an object of the present invention to provide an improved subscription television transmitter for transmitting a coded television signal which includes additional signal components, for eliminating distortion that might otherwise arise.

More particularly, it is an object of this invention to provide an image transmission system in which a video blanking circuit is incorporated, which circuit blanks the video signal for certain time intervals, the timing of these intervals changing in synchronism with the change of timing of the video portion, in such a manner that the video signal content during each line interval does not change when the timing of this portion is altered from one state to another, and whereby the above mentioned objectionable flicker is removed from the transmitted television signal.

It is another object of the invention to provide a novel method of operating a subscription television transmitter.

Figure 1:
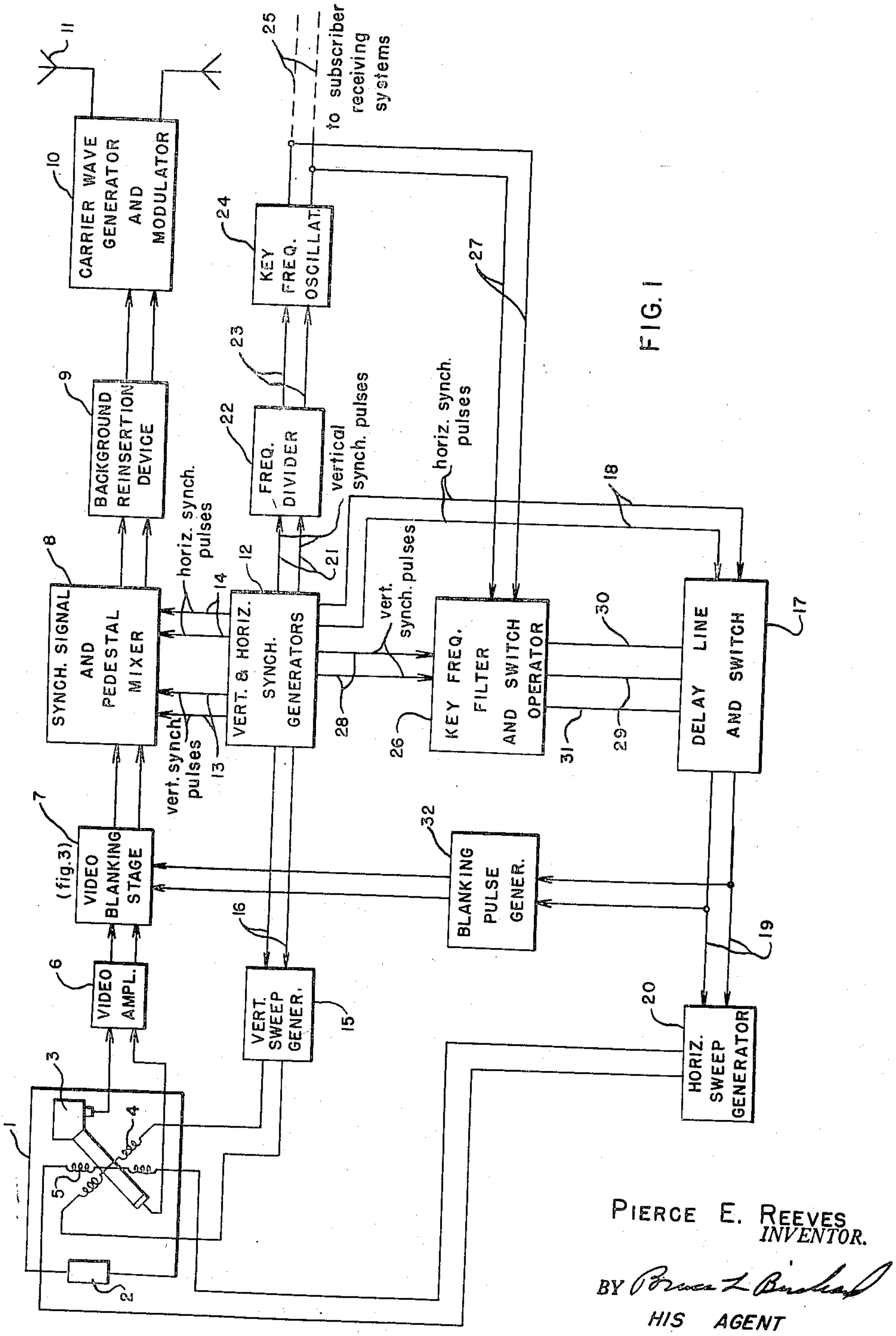
Figure 3:
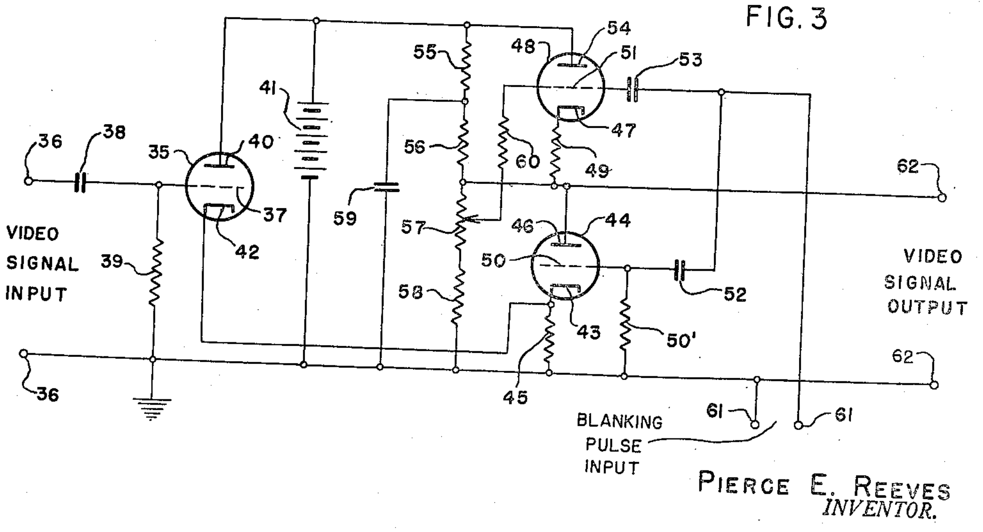

The features of this invention, which are believed to be new, are set forth with particularity in the appended claims. The invention itself, however, together with further objects and advantages thereof may best be understood by reference to the accompanying drawings, in which:

Figure 1 shows an image transmission system of the subscriber type incorporating the present invention, Fiugre 2 shows various diagrams useful for the understanding of the invention, and Figure 3 shows in detail the proposed video blanking circuit.

The system shown in Figure 1 is substantially similar to the system disclosed in the previously mentioned patent, and this system includes a television camera 1 of the usual type. Camera 1 contains a lens system 2 for focusing an image upon an iconoscope or image orthicon 3, which tube is provided with the usual vertical scanning coil 4 and horizontal scanning coil 5. Video signals developed by the iconoscope 3 are amplified through video amplifier 6 and are subsequently transmitted through a video blanking stage 7 to a synchronizing signal and pedestal mixer stage 8, in which mixer appropriate pedestals and synchronizing signals are added to the video signals to produce the desired television signal. The television signal is then transmitted to a background reinsertion device 9 and to a carrier wave generator and modulator 10 in which the television signal, appropriately adjusted as to background level, is modulated on a carrier wave which is radiated from antenna 11.

Vertical and horizontal synchronizing signals are generated in vertical and horizontal synchronizing generators 12 and these synchronizing signals are impressed on mixer 8 by way of respective leads 13 and 14. Vertical synchronizing signals from generators 12 are further impressed on vertical sweep generator 15 by way of leads 16, and the sweep signal output of generator 15 is applied to the vertical sweep coil 4 of tube 3. Horizontal synchronizing signals from generators 12 are further applied to delay line and switch 17 by way of leads 18, the output signals from delay line and switch 17 being impressed by way of leads 19 on a horizontal sweep generator 20 of normal construction, and the sweep signal output of generator 20 being applied to the horizontal sweep coil 5 of tube 3.

In order to perform the desired alterations of the horizontal synchronizing signals in the delay line and switch 17 at properly timed intervals, positive going vertical pulses from the generators 12 are impressed through leads 21 on frequency divider 22 which produces on conductors 23, pulses of lower frequency than the positive going vertical pulses on leads 21. Divider 22 may be any conventional frequency divider circuit, or this divider may take the form of the random frequency divider disclosed in application Serial No. 32,457, E. M. Roschke, entitled Random Frequency Divider, filed June 11, 1948, and issued March 11, 1952, as Patent No. 2,588,413, and assigned to the present assignee. Such lower frequency pulses are impressed through conductors 23 on a key frequency oscillator 24 which produces bursts of oscillation or key signal in response to each pulse on conductors 23, the frequency of which oscillation being suitable for transmission by wire line conductor to subscriber receiving systems. These bursts of oscillation are impressed on conductors 25 which are connected to such receiving systems by way of phone lines, power lines or the like.

The key signal which appears at various time intervals on conductors 25 is applied to key frequency filter and switch operator 26 by way of leads 27. Stage 26 is further supplied with positive going vertical synchronizing pulses from generators 12 by way of leads 28. This stage, in the presence of the key signal on conductors 27, utilizes the positive going vertical pulses on conductors 28 to change the respective potential values of leads 29 and 30 with respect to lead 31. Such change in the potential values of the above mentioned leads causes delay line and switch 17 to alter the timing of the horizontal synchronizing pulses passing through leads 18 to 19 from one condition to another correspondingly to alter the timing of the video signal generated by tube 3.

The system thus far described is similar to that disclosed in previously mentioned Patent 2,547,598 and as in that patent the key signal is generated by oscillator 24 at various time intervals, which intervals are dependent upon the times of occurrence of pulses on leads 23, and this key signal causes delay line and switch 17 to be operated to delay the video portion of the transmitted television signal a predetermined amount during these time intervals. It can further be seen that the key signal is transmitted to subscriber receiving systems to indicate the times of occurrence of the delayed video signal, so that corrective circuits may be initiated at the subscriber receivers.

As previously stated, it was found with such a system that an objectionable flicker occurred in the corrected image at the subscriber receiver due to the fact that the blanking pedestals remain fixed in time to prevent unauthorized synchronization thereon, while the video was moved from a normal to a delayed position in the transmitted signal for coding purposes. The present system provides additional stages for inclusion in the above described system, by means of which the video signal generated by tube 3 is blanked for certain intervals, the timing of which intervals changes in synchronism with the change in the timing of the video portion of the television signal. For this purpose, a blanking pulse generator 32 is connected to leads 19, this generator may be a usual multivibrator or blocking oscillator, and is triggered by the horizontal synchronizing pulses from delay line and switch 17. These horizontal synchronizing pulses are delayed at certain time intervals and corresponding pulses at the output of generator 32 are similarly delayed. The output of generator 32 is applied to video blanking stage 7, which stage may be adjusted to blank the video signals passing therethrough at times corresponding to the times of occurrence of the pulse output of generator 32.

Figure 2:
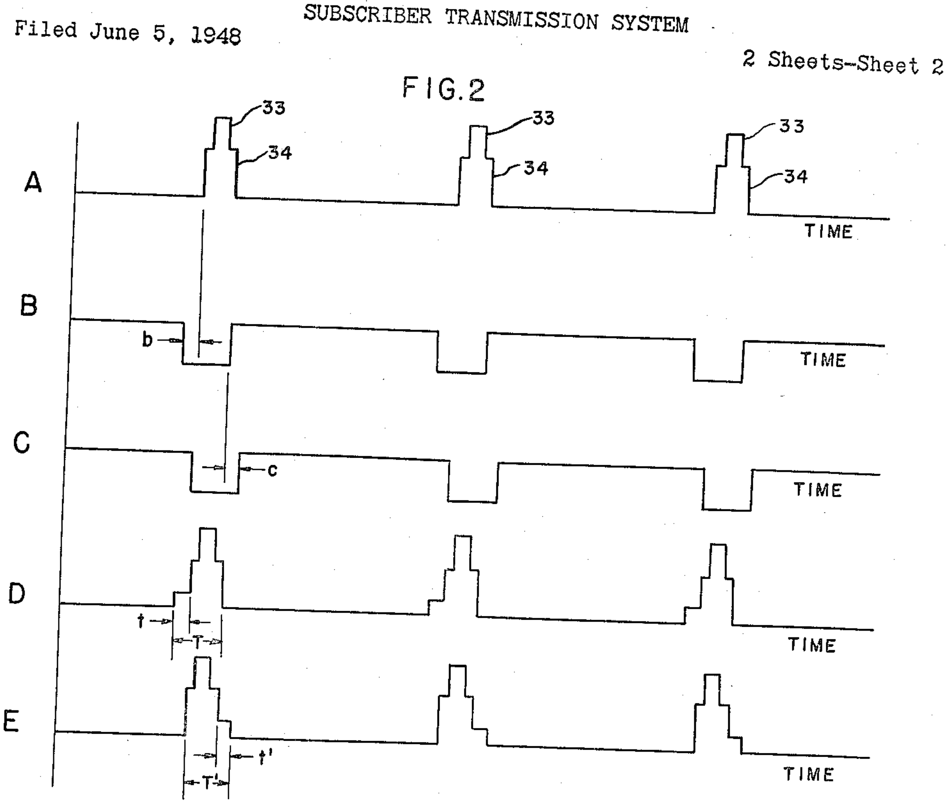

Referring now to Figure 2, horizontal synchronizing pulses 33 superimposed on blanking pedestals 34 are represented at A. The video portion of the signal, not shown, would appear between these blanking pedestals, and as this portion is moved back and forth in time with respect to the pedestals in accordance with the arrangement of Figure 1, the signal content of the video portion during each line interval in its undelayed state is not the same as the signal content of this portion during each line interval in its delayed state. This change in signal content of the video portion during the various line intervals gives rise to flicker in the received television image. The output pulses of generator 32 of Figure 1 are adjusted to have a duration equivalent to the duration of fixed pedestals plus the amount of time delay of the video in its delayed state. Such pulses are shown at B and C, the pulses shown at B occurring at the output of generator 32 when the video is in its undelayed state, and those shown at C occurring when the video is in its delayed state. It can be seen that the pulses at B having a duration equal to that of pedestals 34 of A plus the interval *b*, similarly the pulses at C have a similar duration, having that of pedestals 34 plus interval *c*. Interval *b* equals interval *c* and corresponds to the predetermined time delay of the video during the spaced intervals. It can further be seen that the pulses at B and C change their phase relationship with the fixed pedestals at A in synchronism with the change in the video during these intervals. The pulses shown at B and C cause stage 7 of Figure 1 to blank the video signal for certain intervals, such blanking being shown at D and E. In D the video, not shown, is assumed to be in its undelayed state and the pulses shown at B cause stage 7 to blank a portion of the video during intervals *t*, which intervals would not be blanked in the absence of these pulses. At E the video, not shown, is assumed to be in its delayed state, and the pulses shown at C cause stage 7 to blank a portion of the video during time intervals *t'*, which intervals similarly would not be blanked in the absence of the last mentioned pulses.

It is apparent that in the absence of the video blanking during intervals *t*, when the video is in its undelayed state, the portion of the video that would appear during these time intervals would not appear when the video is in its delayed state, since this portion would then be blanked by a pedestal 34. Similarly, if not blanked, the portion of the video appearing during intervals *t'* when the video is delayed does not appear when the video is in its undelayed state. Hence, the video signal content during each line interval would differ as the video was shifted with respect to the pedestals, and objectionable flicker would be encountered in the received image. The action of stage 7 prevents this flicker by providing blanking during the interval *t* when the video is undelayed, and shifting this blanking to interval *t'* when the video is delayed.

The various components of the present system, apart from stage 7, have been previously described in detail in the aforementioned patent, and further description thereof is believed to be unnecessary. The circuit of the video blanking stage 7 is shown in Figure 3.

Referring now to Figure 3, this circuit includes a discharge device 35. Video signals from image tube 3 of Figure 1 are impressed across terminals 36, one of these terminals being grounded and the other coupled to control electrode 37 of device 35 through capacitor 38, control electrode 37 being connected to ground through resistor 39. The anode 40 of device 35 is connected directly to the positive terminal of a source of unidirectional potential 41, and the cathode 42 of this device is connected to the cathode 43 of device 44, cathodes 42 and 43 being connected to ground through common cathode resistor 45. The anode 46 of device 44 is connected to cathode 47 of device 48 through resistor 49, and the control electrode 50 of this device is coupled to control electrode 51 of device 48 through series connected coupling capacitors 52 and 53, control electrode 50 being connected to ground through grid leak resistor 50'. The anode 54 of device 48 is connected directly to the positive source 41, and anode 46 of device 44 is connected to the mid-point of a potentiometer arrangement which comprises resistors 55, 56, 57 and 58 connected across source 41, the sum of the values of resistors 55 and 56 being equal to the sum of the values of resistors 57 and 58. The junction of resistors 55 and 56 is coupled to ground by capacitor 59 so that resistors 55 and 58 may be given a high value for low drain on source 41 and still allow the circuit 55—59 to exhibit low impedance to alternating currents. Control electrode 51 is connected to a movable tap on resistor 57 through resistor 60. Blanking pulses from stage 32 of Figure 1 are impressed across terminals 61, one of these terminals being connected to ground and the other connected to the common connection of capacitors 52 and 53. The output signals from this circuit, which are impressed on stage 8 of Figure 1, are obtained across terminals 62, one of these terminals being grounded and the other connected to anode 46 of device 44.

It can be seen that devices 44 and 48 are connected across source 41 in series, and since the value of resistor 55 plus resistor 56 is equal to the value of resistor 57 plus resistor 58, these devices have equal potentials impressed thereacross. Devices 44 and 48 have similar characteristics, resistor 49 being included in the circuit of cathode 47 to correct any unbalances in the system and to insure that both the devices 44 and 48 reach cut-off at the same point.

In the absence of negative going pulses from generator 32 of Figure 1 on terminals 61, a video signal impressed across terminals 36 is applied to the control electrode 37 of device 35. Devices 44 and 48 are arranged to be in a conductive state when no negative going pulses appear on terminals 61, and this video signal, by reason of the cathode coupling between devices 35 and 44, appears at the anode 46 of device 44 and, hence, across terminals 62. It is noted that the signal output across terminals 62 has the same phase as the signal impressed across terminals 36, since device 35 is cathode coupled to device 44 and, hence, there is no phase reversal in the signal translating circuit of Figure 3. The average level of the output signal at terminals 62 may be varied by adjusting the tap on resistor 57 and, hence, the bias on control electrode 51.

When a negative going pulse of amplitude equivalent to the amplitude of pulses from stage 32 of Figure 1 appears across terminals 61, and for the duration of each of such pulses, the circuit is so arranged that the pulses have a negative amplitude sufficient to cut-off devices 44 and 48, these pulses being applied to the control electrodes of these devices through coupling capacitors 52 and 53. The potential across the output terminals now becomes substantially one-half that of source 41 due to the connection of these terminals to potentiometer 55—58, and this potential is independent of the video signal across terminals 36.

Hence, the average value of the video signal at output terminals 62 may be given any desired value with respect to the blanked level by adjustment of the tap on resistor 57, the blanked level remaining at one-half the value of source 41. This average value is usually adjusted to be substantially equal or a little below the blanked level. It has been found with such an adjustment that the flicker in the received image is completely removed and at the same time the blanked level is sufficiently low to prevent unauthorized synchronization thereon.

It can be seen by reference to Figure 2 that when the pulses at B are impressed on terminals 61, the video blanking extends for time T and has a phase relation with the fixed blanking pedestals, as shown at D. In the intervals between the pulses at B, the video is passed by the system of Figure 3, and when a shift in the timing of the video causes the pulses at B to change in phase relation with the fixed pedestals to the pulses at C, these last mentioned pulses are impressed on terminals 61, and cause the blanking circuit to blank the video for a similar time interval T', this blanking interval having a phase relation with the blanking pedestals as shown at E.

This invention therefore provides in a television transmission system of the subscriber type, a circuit for insuring that the video portion of the transmitted signal has the same signal content in each line interval when the timing of this portion is altered with respect to the synchronizing and pedestal portions of the transmitted signal, and hence this circuit suppresses undesirable flicker which would appear in the received image.

While a particular embodiment of the invention has been shown and described, various modifications may be made without departing therefrom. It is intended in the appended claims to cover all such modifications as fall within the true spirit and scope of the invention.

I claim:

1. A subscriber television transmitter comprising: a video-signal generating device; a scanning system for controlling said device to develop during recurrent line-trace intervals a video signal representing a scanned subject and including a synchronizing-signal generator for developing during interposed retrace intervals a synchronizing signal normally having a certain time relation with respect to said video signal; a coding circuit for altering the timing of said video signal with respect to said synchronizing signal during spaced operating intervals; a mixer circuit coupled to said device and to said scanning system for producing a television signal which includes in alternation said video signal and said synchronizing signal; means coupled to said mixer for transmitting said television signal to a point remote from said transmitter; a blanking circuit coupled to said mixer circuit for blanking said video signal; and means controlled by said coding circuit for actuating said blanking circuit to blank said video signal normally during a certain preselected portion of each of said line-trace intervals, and to blank said video signal during a different preselected portion of each of said line-trace intervals during said spaced operating intervals.

2. A subscriber television transmitter comprising: a video-signal generating device; a scanning system for controlling said device to develop during recurrent line-trace intervals a video signal representing a scanned subject and including a synchronizing-signal generator for developing during interposed retrace intervals a synchronizing signal normally having a certain time relation with respect to said video signal; a coding circuit for delaying the timing of said video signal with respect to said synchronizing signal a certain predetermined amount during spaced operating intervals; a mixer circuit coupled to said device and to said scanning system for producing a television signal which includes in alternation said video signal and said synchronizing signal; means coupled to said mixer for transmitting said television signal to a point remote from said transmitter; a blanking circuit coupled to said mixer circuit for blanking said video signal; and means controlled by said coding circuit for actuating said blanking circuit to blank said video signal normally at the trailing portion of each of said line-trace intervals, and during said spaced operating intervals to blank said video signal at the leading portion of each of said line-trace intervals, for a period corresponding to the time delay of said video signal with respect to said synchronizing signal during said spaced intervals.

3. A subscriber television transmitter comprising: a video-signal generating device; a scanning system for controlling said device to develop during recurrent line-trace intervals a video signal representing a scanned subject and including a synchronizing-signal generator for developing during interposed retrace intervals a synchronizing signal normally having a certain time relation with respect to said video signal; a coding circuit coupled to said scanning system for altering the timing of said video signal with respect to said synchronizing signal during spaced operating intervals; a mixer circuit coupled to said device and to said scanning system for producing a television signal which includes in alternation said video signal and said synchronizing signal; means including a carrier-wave generator and modulator coupled to said mixer for transmitting said television signal to a point remote from said transmitter; a blanking circuit coupled to said mixer circuit for blanking said video signal; and means controlled by said coding circuit for supplying blanking pulses to said blanking circuit to blank said video signal normally during a certain preselected portion of each of said line-trace intervals, and to blank said video signal during a different preselected portion of each of said line-trace intervals during said spaced operating intervals.

4. A subscriber television transmitter comprising: a video-signal generating device; a scanning system for controlling said device to develop during recurrent line-trace intervals a video signal representing a scanned subject and including a synchronizing-signal generator for developing during interposed retrace intervals a synchronizing signal normally having a certain time relation with respect to said video signal; a coding circuit coupled to said scanning system for altering the timing of said video signal with respect to said synchronizing signal during spaced operating intervals; a mixer circuit coupled to said device and to said scanning system for producing a television signal which includes in alternation said video signal and said synchronizing signal; means including a carrier-wave generator and modulator coupled to said mixer for transmitting said television signal to a point remote from said transmitter; a blanking circuit disposed between said video-signal generating device and said mixer circuit for suppressing said video signal and supplying a potential having a predetermined amplitude to said mixer circuit; and means controlled by said coding circuit for normally actuating said blanking circuit for recurrent intervals including a predetermined portion of each of said line-trace intervals, and for actuating said blanking circuit for recurrent intervals including a different predetermined portion of each of said line-trace intervals during said spaced operating intervals.

5. A subscriber television transmitter comprising: a video-signal generating device; a scanning system for controlling said device to develop during recurrent line-trace intervals a video signal representing a scanned subject and including a synchronizing-signal generator for developing during interposed retrace intervals a synchronizing signal normally having a certain time relation with respect to said video signal; a key-frequency oscillator coupled to said synchronizing-signal generator for developing a key signal; a coding circuit included in said scanning system for altering the timing of said video signal with respect to said synchronizing signal; apparatus coupled to said key-frequency oscillator for actuating said coding circuit during spaced operating intervals; a mixer circuit coupled to said device and to said scanning system for producing a television signal which includes in alternation said video signal and said synchronizing signal; means including a carrier-wave generator and modulator coupled to said mixer for transmitting said television signal to a point remote from said transmitter; a blanking circuit disposed between said video-signal generating device and said mixer circuit for suppressing said video signal as applied to said mixer circuit; and means controlled by said coding circuit for normally actuating said blanking circuit for recurrent intervals including a predetermined portion of each of said line-trace intervals, and for actuating said blanking circuit for recurrent intervals including a different predetermined portion of each of said line-trace intervals during said spaced operating intervals.

6. In a subscriber television transmitter having a video-signal generating device for developing a video signal during each of a series of time spaced line-trace intervals and apparatus for transmitting said signal to a point remote from said transmitter, a blanking stage for coupling said device to said transmitting apparatus, said blanking stage comprising a potential-divider network, a normally conductive electron-discharge device having an input circuit coupled to said video-signal generating device and having an output electrode coupled to a point on said potential-divider network whereby a portion of said network forms an output circuit for said discharge device, and a connection extending from said point on said potential divider and a point of reference potential to said transmitting apparatus; and a source of control pulses coupled to said discharge device for rendering said discharge device non-conductive during a selected part of each of said line-trace intervals to establish the level of video signal applied to said transmitting apparatus at a preselected value during said part of each of said line-trace intervals.

7. In a subscriber television transmitter having a video-signal generating device for developing a video signal during each of a series of time spaced line-trace intervals and apparatus for transmitting said signal to a point remote from said transmitter, a blanking stage for coupling said device to said transmitting apparatus, said blanking stage comprising a potential-divider network, a normally conductive electron-discharge device having an input circuit coupled to said video-signal generating device and having an output electrode coupled to a point on said potential-divider network whereby a portion of said network forms an output circuit for said discharge device, a variable-impedance device connected in shunt with said portion of said potential-divider network, and a connection extending from said point on said potential divider and a point of reference potential to said transmitting apparatus for applying said video signal to said transmitting apparatus with an average value determined by the setting of said variable-impedance device; and a source of control pulses coupled to said discharge device for rendering said discharge device non-conductive during a selected part of each of said line-trace intervals to establish the level of said video signal applied to said transmitting apparatus at a preselected value during said part of each of said line-trace intervals.

8. In a subscriber television transmitter having a video-signal generating device for developing a video signal during each of a series of time spaced line-trace intervals and apparatus for transmitting said signal to a point remote from said transmitter, a blanking stage for coupling said device to said transmitting apparatus, said blanking stage comprising: a potential divider network, a first normally conductive electron-discharge device having an input circuit coupled to said video-signal generating device and having an output electrode coupled to a point on said potential-divider network whereby a portion of said network forms an output circuit for said discharge device, a second normally-conductive electron-discharge device forming a variable-impedance device connected in shunt with said portion of said potential-divider network, and a connection extending from said point on said potential divider and a point of reference potential to said transmitting apparatus for applying said video signal to said transmitting apparatus with an average value determined by the setting of said second discharge device; and a source of control pulses coupled to said discharge devices for rendering said discharge devices non-conductive during a selected part of each of said line-trace intervals to establish the level of said video signal applied to said transmitting apparatus at a preselected value during said part of each of said line-trace intervals.

9. In a subscriber television transmitter having a video-signal generating device for developing a video signal during each of a series of time spaced line-trace intervals and apparatus for transmitting said signal to a point remote from said transmitter, a blanking stage for coupling said device to said transmitting apparatus, said blanking stage comprising: a potential-divider network, a first normally conductive electron-discharge device having an input circuit coupled to said video-signal generating device and having an output electrode coupled to a point on said potential-divider network whereby a portion of said network forms an output circuit for said discharge device, a second normally conductive electron-discharge device having a cathode connected to said point on said potential-divider network, an anode connected to one end of said network, and a control electrode coupled to an adjustable tap thereon, and a connection extending from said point on said potential divider and the other end thereof to said transmitting apparatus for applying said video signal to said transmitting apparatus with an average value determined by the setting of said adjustable tap; and a source of control pulses coupled to said discharge devices for rendering said discharge devices non-conductive during a selected part of each of said line-trace intervals to establish the level of said video signal applied to said transmitting apparatus at a preselected value during said part of each of said line-trace intervals.

10. A subscriber television transmitter comprising: a video-signal generating device; a scanning system for controlling said device to develop during recurrent line-trace intervals a video signal representing a scanned subject and including a synchronizing-signal generator for developing during interposed retrace intervals a synchronizing signal normally having a certain time relation with respect to said video signal; a coding circuit for altering the timing of said video signal with respect to said synchronizing signal during spaced operating intervals; a mixer circuit coupled to said device and to said scanning system for producing a television signal which includes in alternation said video signal and said synchronizing signal; means coupled to said mixer for transmitting said television signal to a point remote from said transmitter; a blanking circuit effectively coupled to said generating device for blanking said video signal; and means controlled by said coding circuit for actuating said blanking circuit to blank said video signal normally during a certain preselected portion of each of said line-trace intervals, and to blank said video signal during a different preselected portion of each of said line-trace intervals during said spaced operating intervals.

11. A subscriber television transmitter comprising: a video-signal generating device; a scanning system for controlling said device to develop during recurrent line-trace intervals a video signal representing a scanned subject and including a synchronizing-signal generator for developing during interposed retrace intervals a synchronizing signal normally having a certain time relation with respect to said video signal; a coding circuit coupled to said scanning system for altering the timing of said video signal with respect to said synchronizing signal during spaced operating intervals; a mixer circuit coupled to said device and to said scanning system for producing a television signal which includes in alternation said video signal and said synchronizing signal; means including a carrier-wave generator and modulator coupled to said mixer for transmitting said television signal to a point remote from said transmitter; a blanking circuit for establishing the value of said video signal at a preselected reference level representing a shade value which is independent of said scanned subject; and means controlled by said coding circuit for normally actuating said blanking circuit for recurrent intervals including a predetermined portion of each of said line-trace intervals, and for actuating said blanking circuit for recurrent intervals including a different predetermined portion of each of said line-trace intervals during said spaced operating intervals.

12. A subscription television transmitter comprising: a video signal generating device; a scanning system for controlling said device to develop during recurrent line-trace intervals a video signal representing a scanned subject and including a synchronizing signal generator for developing a synchronizing signal during each of recurrent retrace intervals interposed between said line-trace intervals; a coding circuit for altering the time relation of said video signal with respect to said synchronizing signal in accordance with a coding schedule; a mixer circuit coupled to said device and to said scanning system for producing a television signal which includes in alternation said video signal and said synchronizing signal; a blanking circuit for establishing said video signal at a reference level representing a shade value independent of the scanned subject; and means controlled by said coding circuit for actuating said blanking circuit during a portion of each of said line-trace intervals, selected in accordance with said coding schedule, to equalize the video content represented by said video signal during said line-trace intervals.

13. A subscription television transmitter comprising: a video signal generating device; a scanning system for controlling said device to develop during recurrent line-trace intervals a video signal representing a scanned subject and including a synchronizing signal generator for developing a synchronizing signal during each of recurrent retrace intervals interposed between said line-trace intervals; a coding circuit for altering the time relation of said video signal with respect to said synchronizing signal in accordance with a coding schedule; a mixer circuit coupled to said device and to said scanning system for producing a television signal which includes in alternation said video signal and said synchronizing signal; a blanking circuit for establishing said video signal at a reference level representing a shade value independent of the scanned subject; and means for supplying control signals to said blanking circuit during a selected portion of each of said line-trace intervals to actuate said blanking circuit and equalize the video content represented by said video signal during said line-trace intervals irrespective of the time relation of said video signal and said synchronizing signal.

14. The method of operating a subscription television transmitter which comprises the following steps: scanning a subject during recurrent line-trace intervals to develop in each such interval a video signal representing the scanned subject; developing during interposed retrace intervals a synchronizing signal; varying the time relation of said video signal in respect of said synchronizing signal in accordance with a coding schedule; and establishing a selected portion of said video signal of each such line-trace interval at a reference shade value to equalize the video content represented by said video signal during said line-trace intervals irrespective of the time relation of said video signal and said synchronizing signal.

15. The method of operating a subscription television transmitter which comprises the following steps: scanning a subject during recurrent line-trace intervals to develop in each such interval a video signal representing the scanned subject; developing during interposed retrace intervals a synchronizing signal; varying the time relation of said video signal in respect of said synchronizing signal in accordance with a coding schedule; and establishing a portion of said video signal of each such line-trace interval, selected in accordance with said coding schedule, at a reference shade value which is independent of the scanned subject to equalize the video content represented by said video signal during said line-trace intervals irrespective of the time relation of said video signal and said synchronizing signal.

PIERCE E. REEVES.

References Cited in the file of this patent

UNITED STATES PATENTS

| Number | Name | Date |
|---|---|---|
| 2,207,048 | Campbell | July 9, 1940 |
| 2,245,428 | Campbell | June 10, 1941 |
| 2,335,278 | Hilferty | Nov. 30, 1943 |
| 2,350,008 | Artzt | May 30, 1944 |
| 2,366,358 | Schlesinger | Jan. 2, 1945 |
| 2,401,441 | Tolson | June 4, 1946 |
| 2,405,252 | Goldsmith | Aug. 6, 1946 |
| 2,471,903 | Schade | May 31, 1949 |
| 2,487,641 | Denk | Nov. 8, 1949 |
| 2,490,561 | Ussler | Dec. 6, 1949 |
| 2,510,046 | Ellett et al. | May 30, 1950 |
| 2,526,694 | Samet | Oct. 24, 1950 |
| 2,531,974 | Ellett | Nov. 28, 1950 |
| 2,547,598 | Ruschke | Apr. 3, 1951 |
| 2,567,545 | Brown | Sept. 11, 1951 |
| 2,570,187 | Aram | Oct. 9, 1951 |